US006526936B2

(12) United States Patent
Nalim

(10) Patent No.: US 6,526,936 B2
(45) Date of Patent: Mar. 4, 2003

(54) PARTITIONED MULTI-CHANNEL COMBUSTOR

(75) Inventor: Mohamed Razi Nalim, Indianapolis, IN (US)

(73) Assignee: Advanced Research and Technology Institute, Indianapolis, IN (US)

( * ) Notice: Subject to any disclaimer, the term of this patent is extended or adjusted under 35 U.S.C. 154(b) by 0 days.

(21) Appl. No.: 09/899,801

(22) Filed: Jul. 5, 2001

(65) Prior Publication Data

US 2002/0068250 A1 Jun. 6, 2002

Related U.S. Application Data

(60) Provisional application No. 60/216,094, filed on Jul. 6, 2000.

(51) Int. Cl.[7] ................................................ F02B 53/08

(52) U.S. Cl. ....................................... 123/213; 123/215

(58) Field of Search ................................ 123/211, 212, 123/213, 214, 215

(56) References Cited

U.S. PATENT DOCUMENTS 2,399,394 A 4/1946 Seippel
2,705,867 A 4/1955 Lewis
3,401,676 A * 9/1968 Wanzenberg ................ 123/215
3,809,020 A * 5/1974 Takitani ...................... 123/215
3,931,553 A 1/1976 Stich
4,240,394 A * 12/1980 Lay ............................ 123/214
4,500,260 A 2/1985 Mayer
4,646,704 A 3/1987 Gora
4,719,746 A 1/1988 Keller
4,744,213 A 5/1988 El-Nashar
4,860,547 A 8/1989 Maldague
4,887,942 A 12/1989 Hauge
4,924,637 A 5/1990 Ikimi
5,154,583 A 10/1992 Althaus
5,197,276 A 3/1993 Keller
5,267,432 A 12/1993 Paxson
5,274,994 A 1/1994 Chyou
5,297,384 A 3/1994 Paxson
5,338,158 A 8/1994 Hauge
5,381,653 A 1/1995 Althaus
5,513,489 A 5/1996 Bussing
5,522,217 A 6/1996 Zauner
5,894,719 A 4/1999 Nalim
5,916,125 A 6/1999 Snyder

FOREIGN PATENT DOCUMENTS

WO 00/68566 11/2000

OTHER PUBLICATIONS

Kentfield, J. A. C., "Circumferential Cell–Dividers in Wave Rotors," 34th AIAA/ASME/SAE/ASEE Joint Propulsion Conference & Exhibit, Cleveland, OH, AIAA98–3397, Jul. 13–15, 1998.

(List continued on next page.)

*Primary Examiner*—Hoang Nguyen
(74) *Attorney, Agent, or Firm*—Dann, Dorfman, Herrell and Skillman

(57) ABSTRACT

A multi-channel combustion device is provided. The device includes an inlet port, at least one radially partitioned inlet zone within the inlet port, and a plurality of circumferentially spaced combustion chambers in which deflagrative or detonative combustion occurs. The inlet port may have a plurality of separate, circumferentially partitioned inlet zones for supplying fuel and air mixtures to the inlet end of the combustion chambers. Each inlet zone is capable of introducing a different combustible mixture sequentially to a given combustion chamber as the chamber communicates with the inlet zones. The inlet of at least one combustion chamber is radially partitioned. At least one inlet zone is radially partitioned to permit radial stratification within the combustion chambers. The multi-channel combustion device may be a combustion wave rotor or a valved combustor.

41 Claims, 10 Drawing Sheets

OTHER PUBLICATIONS

Nalim, M. Razi, "Pulse Combustion and Wave Rotors for High–Speed Propulsion Engines," 8th International Space Planes and Hypersonic Systems and Technologies Conference, Norfolk, VA, Apr. 27–30.

Nalim, M. Razi, "Numerical Study of Stratified Charge Combustion in Wave Rotors," 33rd AIAA/ASME/SAE/ASEE Joint Propulsion Conference and Exhibit, Seattle, WA, AIAA–97–3141, Jul. 6–9, 1997.

Bussing, T. R. A., "A Rotary Valve Multiple Pulse Detonation Engine (RVMPDE)", 31st AIAA/ASME/SAE/ASEE Joint Propulsion Conference and Exhibit, San Diego, CA, AIAA95–2577, Jul. 10–12, 1995.

Goldstein, et al., "Ideal Performance of Valved–Combustors and Applicability to Several Engine Types," Trans. Of the American Society of Mechanical Engineers, 80, Jul. 1958, pp. 1027–1036.

Nalim, et al., "A Numerical Investigation of Premixed Combustion in Wave Rotors," 41st Gas Turbine and Aeroengine Congress sponsored by the International Gas Turbine Institute of the American Society of Mechanical Engineers, Brimingham, United Kingdom, Jun. 10–13, 1996.

Berchtold, et al., "Supercharging with Comprex. Application and Experience," cite unknown.

Comprex, "The Comprex Pressure Wave Supercahrger. . " Informative advertisement from Comprex AG, CH–5507 Melligen, Switzerland.

Schapker, R. L., "Analysis of a Wave Combustor Designed for Time–Steady Inlet and Discharge Conditions," AGT—Technical Information Series No. DF58AGT387, Flight Propulsion Laboratory Department, Aircraft Gas Turbine Division, General Electric, Cincinnati, Ohio, Jun., 1958.

Nalim, M. R., "Assessment of Combustion Modes for Internal Combustion Wave Rotors" Journal of Engineering for Gas Turbines and Power, vol. 121, pp. 265–271 (Apr. 1999).

Vickers Catalog, "Comprex, the pressure wave supercharger" advertisement for Model CX 93.

Tabaczynski, R., "Turbulence and Turbulent Combustion in Spark–Ignition Engines" Prog. Energy Combust. Sci., vol, 2, pp 143–165 (1976).

Bilgin, M. et al., "Ignition and Flame Propagation Process with Rotating Hot Jets In a Simulated Wave Engine Test Cell" 34th AIAA/ASME/SAE/ASEE Joint Propulsion Conference & Exhibit, Cleveland, OH AIAA–98–3399, Jul. 13–15, 1998.

Welch, G., "Wave—Rotor—Enhanced Gas Turbine Engines" Journal of Engineering for Gas Turbines and Power, vol. 119 (Apr. 1997).

Nalim, M. R., "Wave Cycle Design for Wave Rotors Engines with Limited Nitrogen Oxide Emissions" Cornell University, 1994.

* cited by examiner

PARTITIONED MULTI-CHANNEL COMBUSTOR

RELATED APPLICATIONS

This application claims the benefit of co-pending U.S. Provisional Application Ser. No. 60/216,094, filed Jul. 6, 2000, such application being incorporated herein by reference.

FIELD OF THE INVENTION

The present invention relates generally to a valved combustor or combustion wave rotor, and in particular to a valved combustor or combustion wave rotor having partitions at the inlet thereto.

BACKGROUND OF THE INVENTION

Combustion engines offering superior performance are highly desirable for use in power generation, ground transportation, and air vehicle propulsion. It is desirable to simultaneously improve engine efficiency and reduce harmful emissions of nitrogen oxides ($NO_x$), other pollutants, and greenhouse gases. Conventional gas turbines based on steady-flow turbomachine components, and conventional internal-combustion engines based on semi-static mechanical compression and expansion, have fundamental thermodynamic or throughput limitations on performance. It is particularly desirable to provide gas turbine engines and jet engines with a combustion device that produces a gain in pressure during combustion, while retaining high throughput, in order to maximize power output and efficiency. It is also desirable to provide engines which are environmentally acceptable and minimize pollutants such as $NO_x$ emissions.

A quantum increase in engine performance is possible by developing dynamically non-steady processes and devices that exploit wave phenomena and intermittent pressure-gain combustion for novel engines. By understanding and exploiting complex non-steady flow it is possible to simplify the hardware of the engine, making it less costly and more durable. Such flow and combustion processes can be realized in either a combustion wave rotor or in a valved combustor.

Combustion processes that improve engine efficiency can benefit from high pressure and temperature, which in turn, however, create heat management problems and pollutant emissions in the combustion device. Thus, it is desirable to provide a combustion device which is capable of operating at elevated temperatures with short residence times to reduce pollution emissions and which also provides proper heat management.

SUMMARY OF THE INVENTION

The present invention overcomes the existing problems by providing an internal combustion device, such as wave rotor or rotary-valved combustor, having reduced pollution emissions and using circumferential partitioning to effect heat management. In particular, the circumferential partitioning permits a non-combustible gas to be placed adjacent to the hub and shroud to reduce the leakage of hot gas from the inlet side of the combustion chambers and to also help cool the combustion device. The present invention also improves combustion wave rotors and valved combustors by providing a partitioned multi-channel combustor that minimizes $NO_x$ pollution through a method of pilot ignition. The present invention provides a promising means of pressure-gain combustion, which approaches the thermodynamic ideal of constant-volume combustion, providing significant enhancement of gas turbine and jet engine performance.

A multi-channel combustor is provided to create pressurized hot gas by detonative or deflagrative combustion for turbine rotation or jet propulsion. In general, a combustion device of the present invention includes a housing having at least one inlet port. A plurality of combustion chambers are mounted within the housing. The chambers each have an inlet end for gaseous communication with the inlet port. The inlet end of a chamber has a fuel partition injection region. At least one inlet zone is disposed within the inlet port. The inlet zone may optionally be sized to communicate substantially with only the fuel partition injection region at the inlet end of the chamber. The inlet zone includes partitions to partition the inlet zone into separate channels, for example, in the radial direction relative to a longitudinal axis of the combustion chambers. At least one channel is adapted to register with the fuel partition injection region of the combustion chamber. A first specific configuration of the combustion device provides a combustion wave rotor, and a second configuration provides a valved combustor.

The combustion wave rotor is an on-rotor combustion device where the combustion process occurs within the combustion chambers of the rotor, creating detonative or deflagrative combustion within the rotor. The combustion wave rotor includes a housing, one or more inlet ports in the housing, one or more exhaust ports in the housing, a rotor mounted within the housing, one or more igniters, and, optionally, a motor for rotating the rotor. The rotor includes a plurality of combustion chambers in which combustion occurs. Each combustion chamber has an inlet end for communication with the inlet port and has an outlet end for communication with the exhaust port.

To promote the creation of detonative or deflagrative combustion, a plurality of separate inlet zones may be provided in the inlet port for supplying fuel and air mixtures to the inlet end of the combustion chambers. The inlet zones are circumferentially spaced about the perimeter of the combustion chambers so that the combustion chambers interact with these inlet zones sequentially as the combustion chambers or inlet zones rotate past one another. At least one of the inlet zones has circumferential partitions to segment the inlet zones in the radial direction. A fuel injector is provided in selected inlet zones for injecting fuel into each respective zone. Each inlet zone is capable of introducing a different combustible mixture sequentially into a given combustion chamber as the chamber comes into communication with a respective inlet zone. For example, a first inlet zone may be provided to introduce air, without fuel, into the chamber. As the combustion chamber is brought into registry with a second inlet zone, a fuel or fuel mixture may be introduced into the chamber. Additional inlet zones may be provided for successively introducing additional fuel or fuel mixtures, which may be different from other fuels or fuel concentrations, into the chamber. Another inlet zone, such as the last inlet zone, may introduce a combustion enhancer or a mixture of fuel and the combustion enhancer into the combustion chamber proximal to the source of ignition, to enhance detonative combustion. Using successive inlet zones results in the stratification of differing concentrations of combustible material within the combustion chambers.

The combustion chambers optionally include circumferential partitions that may closely align with the circumferential partitions in the inlet zone, and may extend from the plane of the inlet end into the chamber approximately one-twentieth to one-fifth of the length of the chamber in the longitudinal direction. These partitions create a small pilot-ignition volume within the combustion chamber that momentarily contains a mixture that is particularly well suited for ignition and allows the combustion of a fuel-lean mixture in the remainder of the combustion chamber, resulting in lower $NO_x$ emissions.

These partitions also allow a non-combustible gas such as air to be introduced in the region of the combustion chamber near the inlet from which leakage may occur during combustion and pressurization in the chamber. The placement of a non-combustible gas adjacent the hub and shroud can substantially eliminate the leakage of hot gas from the inlet side of the rotor and also help to cool the rotor. This can minimize thermal damage of the bearings and other components of the wave rotor, as well as provide a further level of control of the rotor temperature and its gradient. In addition, the most readily ignited mixture may be supplied only to the central section to avoid preignition by hot gas leaking into the low-pressure inflowing gas.

The initiation of detonation is improved by providing a more confined location for containing a detonation susceptible gas mixture which permits less ignition energy to initiate detonation. Detonation initiation and propagation processes have channel size requirements that may be smaller than the height of the main combustion chamber. Also, initiation of detonation can be aided by additional turbulence generated by geometric irregularities in the partitions. The use of circumferential partitions in the combustion chamber permits control of this dimension in the initiation phase.

The present invention is particularly well-suited to a combustion wave rotor. The inlet and exhaust aerodynamics of a wave rotor are superior to those of a valved combustor. However, a valved combustor, having a non-rotating part that is "loaded" with pressure and heat, has mechanical and thermal advantages over the wave rotor. The stationary combustion chambers of the valved combustor can have more robust construction and cooling methods than the rotating combustion chambers of the combustion wave rotor. The preferred choice will depend on the application and economic factors.

Consequently, the present invention also provides a valved combustor where the combustion process occurs within stationary combustion chambers. The valved combustor includes a housing, a plurality of combustion chambers mounted within the housing, a rotor mounted within the housing, one or more inlet ports mounted on the rotor, one or more exhaust ports mounted on the rotor, and one or more igniters mounted at the housing to communicate with the combustion chambers. The combustion chambers extend longitudinally relative to the rotational axis of the rotor. Each combustion chamber has an inlet end for communication with the inlet port of the rotor positioned at one end of the combustion chambers and an outlet end for communication with the exhaust port of the rotor positioned at the other end of the combustion chambers.

To promote the creation of detonative or deflagrative combustion, a plurality of separate inlet zones may be provided in the inlet port of the rotor for supplying fuel and air mixtures to the inlet end of the combustion chambers. The inlet zones are circumferentially spaced about the perimeter of the combustion chambers so that the combustion chambers interact with these inlet zones sequentially. The inlet zones have circumferential partitions to segment the inlet zones in the radial direction. A fuel injector is provided in selected inlet zones for injecting fuel into such respective zones. Each inlet zone is capable of introducing a different combustible mixture sequentially into a given combustion chamber as the inlet zone rotates past the combustion chambers. For example, a first inlet zone may be provided for providing an introduction of air, without fuel, into the chamber. A second inlet zone is subsequently brought into registration with the combustion chamber by rotation of the rotor. The second inlet zone may introduce a fuel or fuel mixture into the chamber. Additional inlet zones may be provided for successively introducing additional air or fuel mixtures, which may be different from other air or fuel concentrations, into the chamber. Another inlet zone, such as the last inlet zone, may introduce a combustion enhancer or a mixture of fuel and combustion enhancer into the combustion chamber proximal to the source of ignition to enhance combustion. Using successive inlet zones results in the stratification of differing concentrations of combustible material within the combustion chambers.

The combustion chambers optionally include circumferential partitions that may closely align with the circumferential partitions in the inlet zone, and may extend from the plane of the inlet end into the chamber approximately one-twentieth to one-fifth of the length of the chamber in the longitudinal direction. These partitions create a small pilot-ignition volume within the combustion chamber that momentarily contains a mixture that is particularly well suited for ignition and allows the combustion of a fuel-lean mixture in the remainder of the combustion chamber, resulting in lower $NO_x$ emissions. These partitions also allow a non-combustible gas such as air to be introduced in the region of the combustion chamber near the inlet end from which leakage may occur during combustion and pressurization in the chamber. This allows leakage of low-temperature air and prevents leakage of hot gas.

The rotor is provided with appropriate rotary seals or other means that allow the passage of fuel and combustion enhancer into passages in the rotor, as required for the supply and injection of fuel and combustion enhancer to inlet zones located in inlet ports mounted on the rotor.

For both the wave rotor combustion engine and the rotary-valved combustor, the length of the combustion chambers, the circumferential width of the inlet and exhaust ports, the placement of the exhaust port(s) relative to the input port(s), and the rotational speed of the rotor are designed to control the cyclic flow processes, wave processes, and combustion processes to support combustion within the combustor. A CPU or electronic control system is optionally provided to control the rates of the rotor rotation, fuel injection, and ignition.

BRIEF DESCRIPTION OF THE DRAWINGS

The foregoing summary and the following detailed description of the preferred embodiments of the present invention will be best understood when read in conjunction with the appended drawings, in which.

Detailed Description Of The Invention

Figure 1:
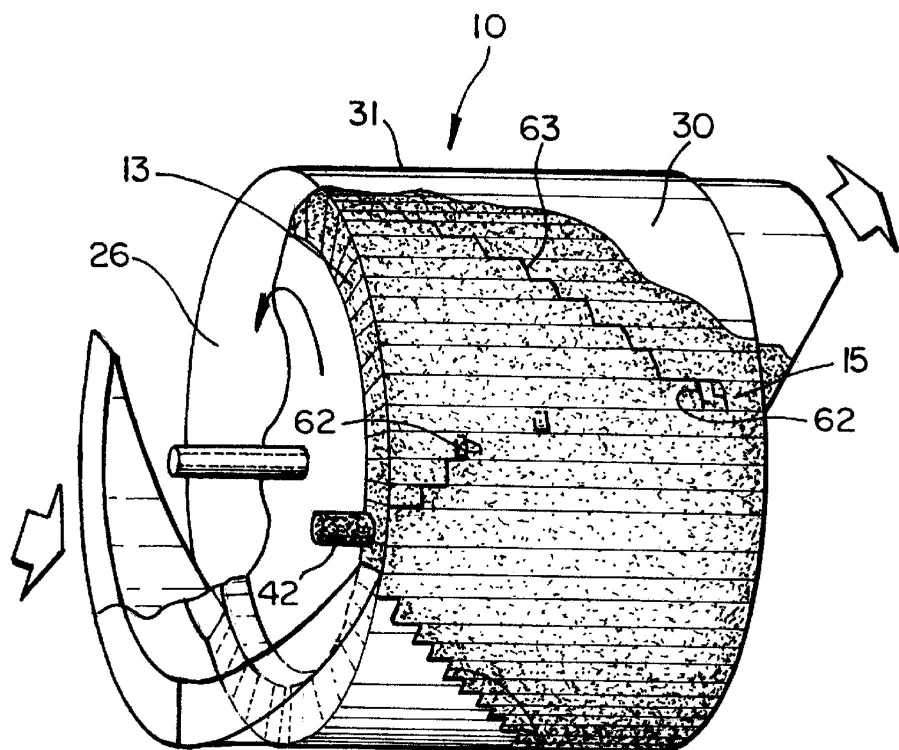
FIG. 1 illustrates a perspective view of a combustion wave rotor broken away in part to reveal combustion channels.
Figure 2:
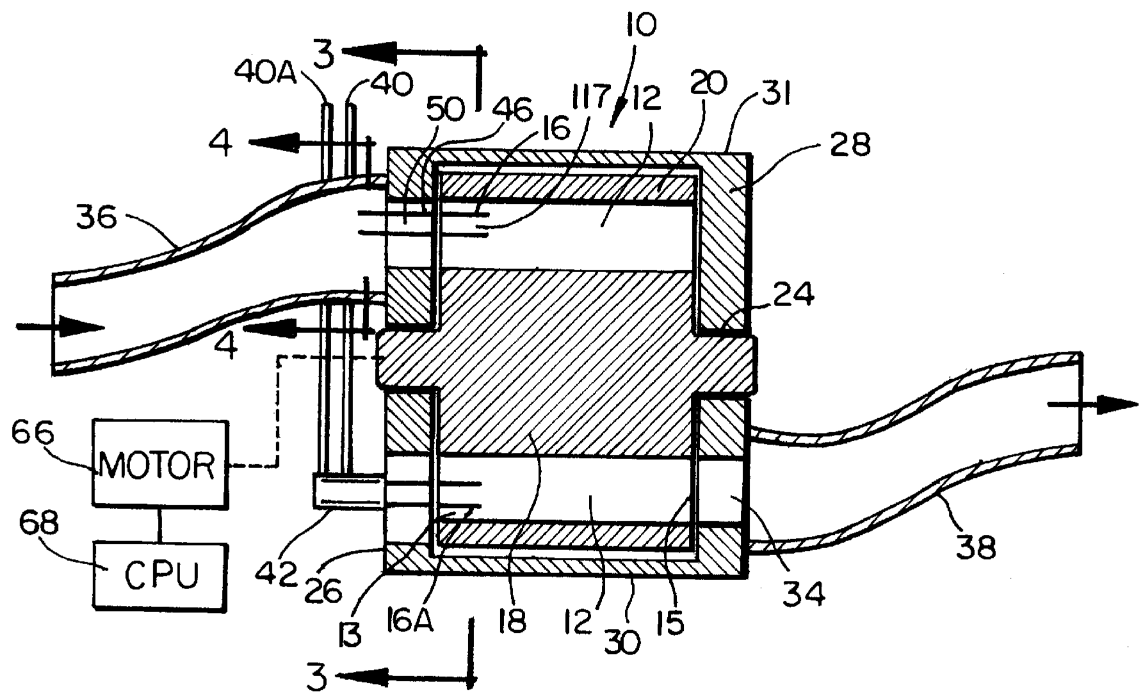
FIG. 2 illustrates a schematic side elevational view in partial cross section of the combustion wave rotor depicted in FIG. 1 showing the wave rotor and its housing in axial cross section.
Figure 2A:
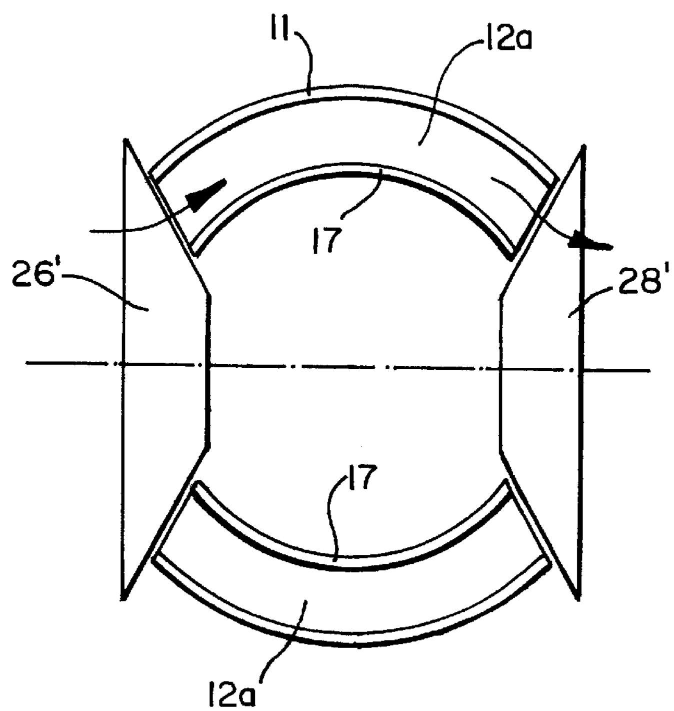
FIG. 2A illustrates a schematic side elevational view of combustion chambers with curved outer and inner walls and non-axial inlet and exhaust flows.
Figure 3:
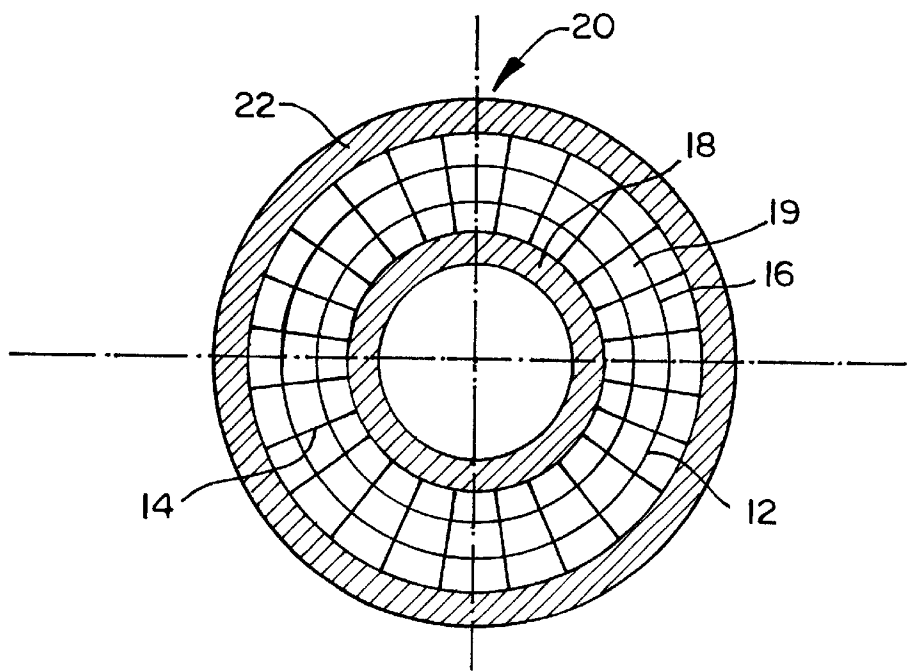
FIG. 3 illustrates a schematic transverse cross-sectional view taken along 3—3 in FIG. 2 with the casing wall not shown.

Referring now to the drawings, wherein like numerals indicate like elements, FIGS. 1 and 2 illustrate a combustion wave rotor 10. The combustion wave rotor 10 includes a rotor 20 rotatably mounted on one or more bearings 24 within a housing 31. The rotor 20 includes a central hub 18, an outer shroud 22, and a plurality of circumferentially-spaced, elongated combustion chambers 12 disposed between the central hub 18 and the outer shroud 22 as shown in FIG. 3. Combustion is conducted in the combustion chambers 12. The combustion chambers 12 are open at each end of the rotor 20 permitting an inflow of combustion reactants at inlet ends 13 of the combustion chambers 12 and an outflow of the combustion products at outlet ends 15 of the combustion chambers 12. The combustion chambers 12 may be longitudinal and of uniform cross-section, as shown in FIGS. 1 and 2, or may be curved and/or of non-uniform cross-section as shown, for example, in FIG. 2A. The configuration of FIG. 2A is particularly suited to deflagrative combustion. The combustion chambers 12*a* may have a curved outer wall 11 and/or a curved inner wall 17. The outer wall 11 and the inner wall 17 are adjacent the outer shroud 22 and the hub 18, respectively.

Returning to FIG. 3, the combustion chambers 12 are formed by vanes 14 extending radially from the hub 18 to the outer shroud 22 so that the combustion chambers 12 extend longitudinally through the rotor from the inlet end 13 to the outlet end 15. The chambers 12 may optionally include circumferential rotor partitions 16 that extend longitudinally, but only partially, into the combustion chamber 12, as best seen in FIGS. 2 and 3. The circumferential rotor partitions 16 provide a fuel injection partition region 117 disposed between the circumferential rotor partitions 16. Typically, the circumferential rotor partitions extend into the combustion chamber 12 one-twentieth to one-fifth the length of the combustion chamber 12. The circumferential rotor partitions 16 segment the inlet end 13 of the combustion chamber 12 in the radial direction to permit radial stratification in the combustion chambers 12 near the inlet end 13.

Figure 7:
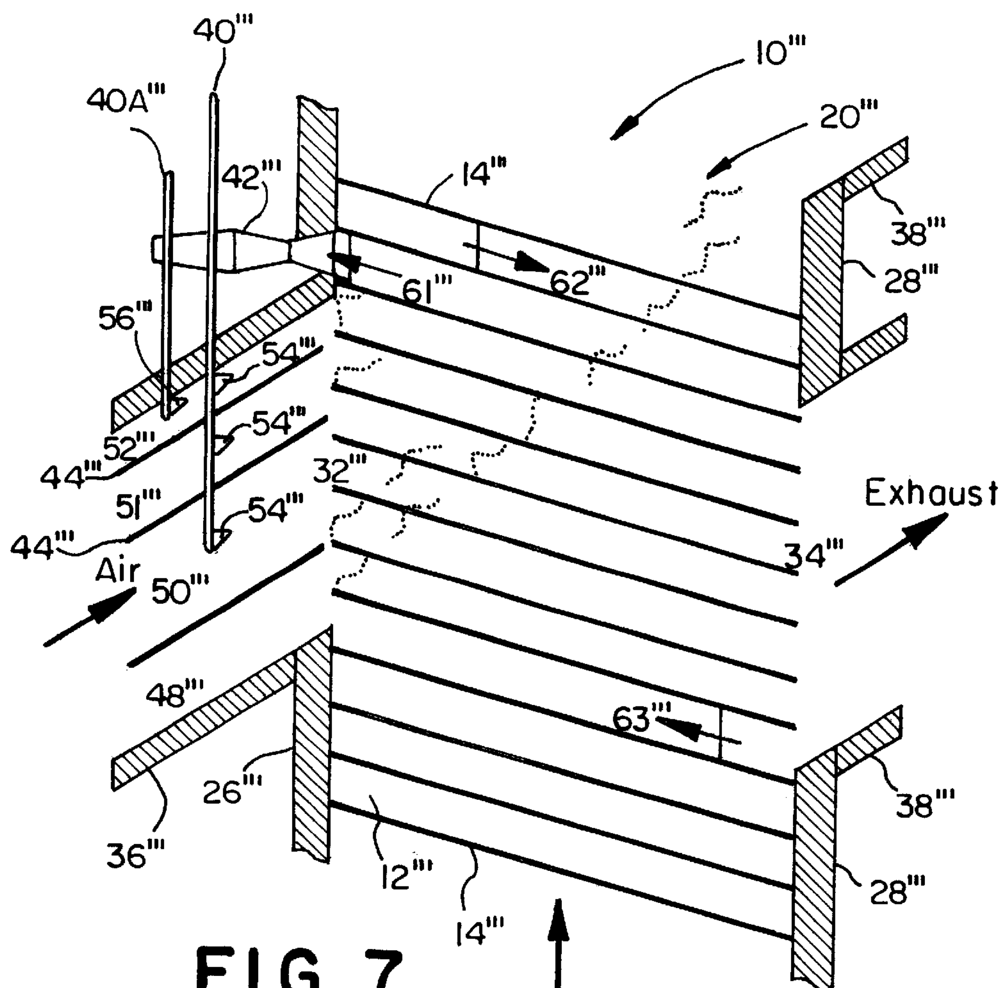
FIG. 7 illustrates a schematic developed view of a combustion wave rotor having helical combustion chambers.

The radial vanes 14 may be straight and axial, as shown in FIG. 3, or may be slanted or curved, as shown, for example, in FIG. 7. The curved vanes 14''' may be helically curved to create combustion chambers 12''' that are helically disposed with respect to a longitudinal axis of the rotor 20''', as shown in FIG. 7.

Other combustion chamber cross sectional shapes are possible. Preferably, the radial height of the annular region containing the combustion chambers 12 is 20% to 40% of the rotor radius. Preferably, at least 15 chambers 12 are disposed about the circumference of a given annular region.

The rotor 20 and housing 31 are formed of metal or other materials known in the manufacture of wave rotors. However, the materials of the wave rotor 20, housing 31, and vanes 14 for use in the combustion wave rotor 10 must be chosen to withstand the combustion process. Preferably, the vanes 14 are integrally formed with the hub 18 and shroud 22. The combustion chambers 12 may be formed by removal of material, such as by boring the combustion chambers 12. Alternately, the rotor 20 and combustion chambers 12 may be formed by an extrusion, casting, or welding process.

Figure 5B:
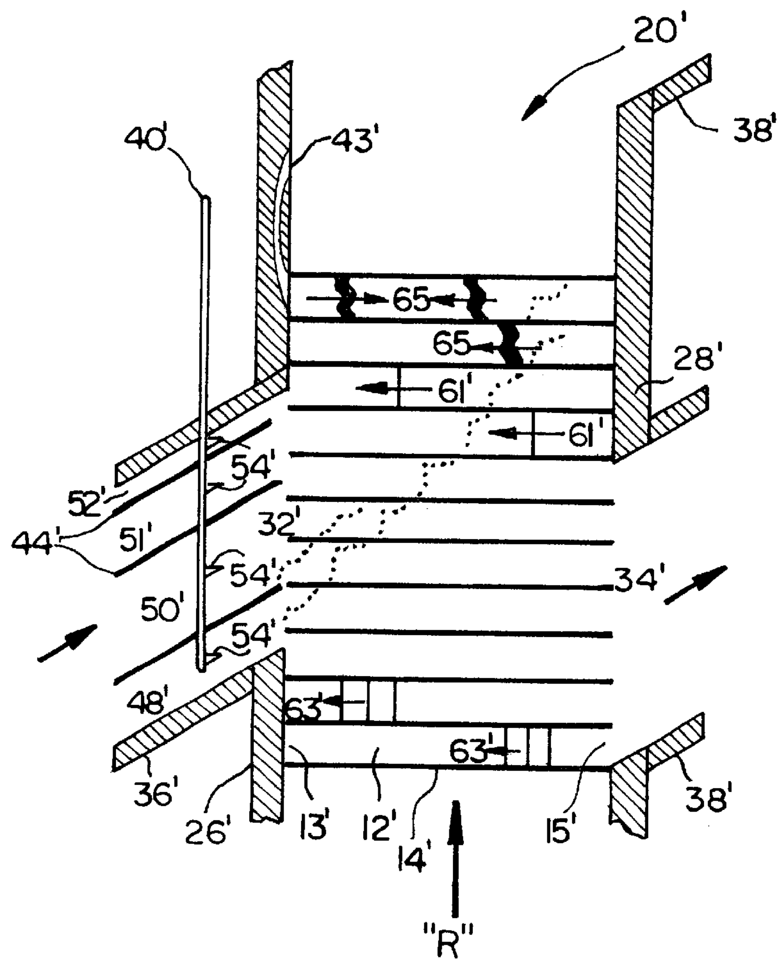
FIG. 5B illustrates a schematic developed view of a combustion wave rotor for deflagrative combustion similar to that shown in FIG. 2.

The housing 31 is in the form of a cylindrical casing 30 and may have a first circular disc-shaped end wall 26 and a second circular disc-shaped end wall 28 in the configurations of FIGS. 1 and 2A. Alternately, the end walls 26', 28' may be conical or conical sections for the configuration of FIG. 2A. The end walls 26, 28 have a central cylindrical aperture for holding the bearings 24 that receive the rotor shaft 21. Optionally, for deflagrative combustion, the first end wall 26' or second end wall 28' may include an ignition passage 43' as seen, for example, in end wall 26' of FIG. 5B. The end walls 26, 28 each have partial-annular ports 32, 34 to allow gases to be admitted to or expelled from the combustion chambers 12. As shown in FIGS. 1, 2, 5A, and 5B, as the first end wall 26 has one inlet port 32 connected to an inlet duct 36, and the second end wall 28 has one exhaust port 34 connected to an exhaust duct 38. In an alternate configuration, as shown in FIG. 6, the combustion wave rotor 10" may have two inlet ports 32" and two exhaust ports 34". The use of two inlet ports 32" and two exhaust ports 34" permits better balancing of the mechanical loads. Even greater numbers of inlet and exhaust ports may be used. Preferably, the number of inlet ports equals the number of exhaust ports.

The relative circumferential locations and extents of these ports are to be determined primarily by calculation of the rates of physical and chemical processes in the gas in the combustion chamber 12, including the speeds of pressure waves and the combustion chemical rates, which differ for deflagrative versus detonative combustion. These calculations taken together with the length and rotation speed of the rotor 20 provide estimates of the time required for transit of waves in terms of circumferential displacement of the rotor 20. These calculations provide estimates of the ignition delay time for initiation of the detonative or deflagrative combustion wave. The housing 31 also contains seals and sealing surfaces that are designed to minimize the leakage of gases to or from the combustion chambers 12 through the gaps between the end walls 26, 28 and the rotor 20.

Figure 5A:
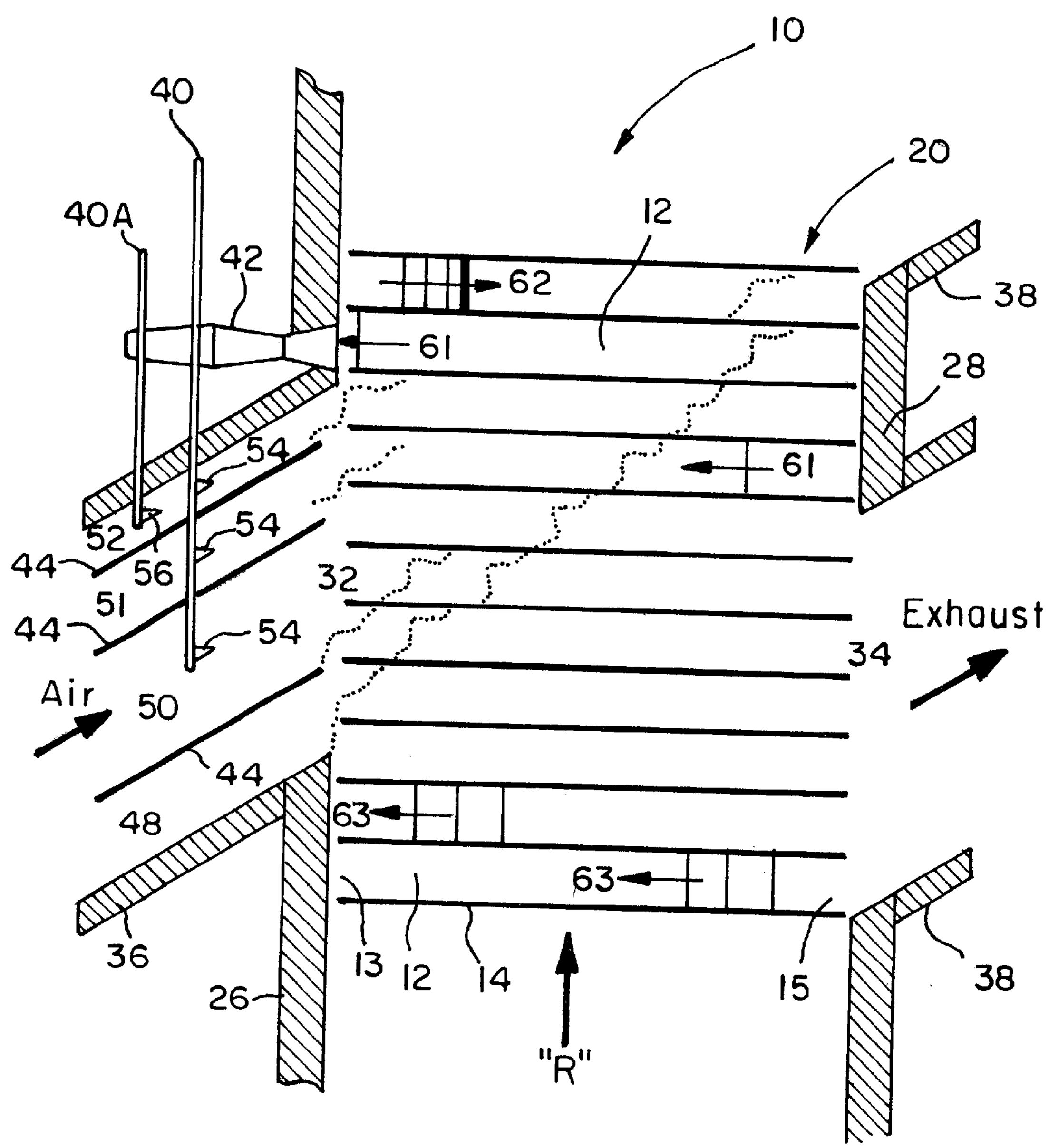
FIG. 5A illustrates a schematic developed view of the combustion wave rotor of FIG. 2, for use in detonative combustion.
Figure 6:
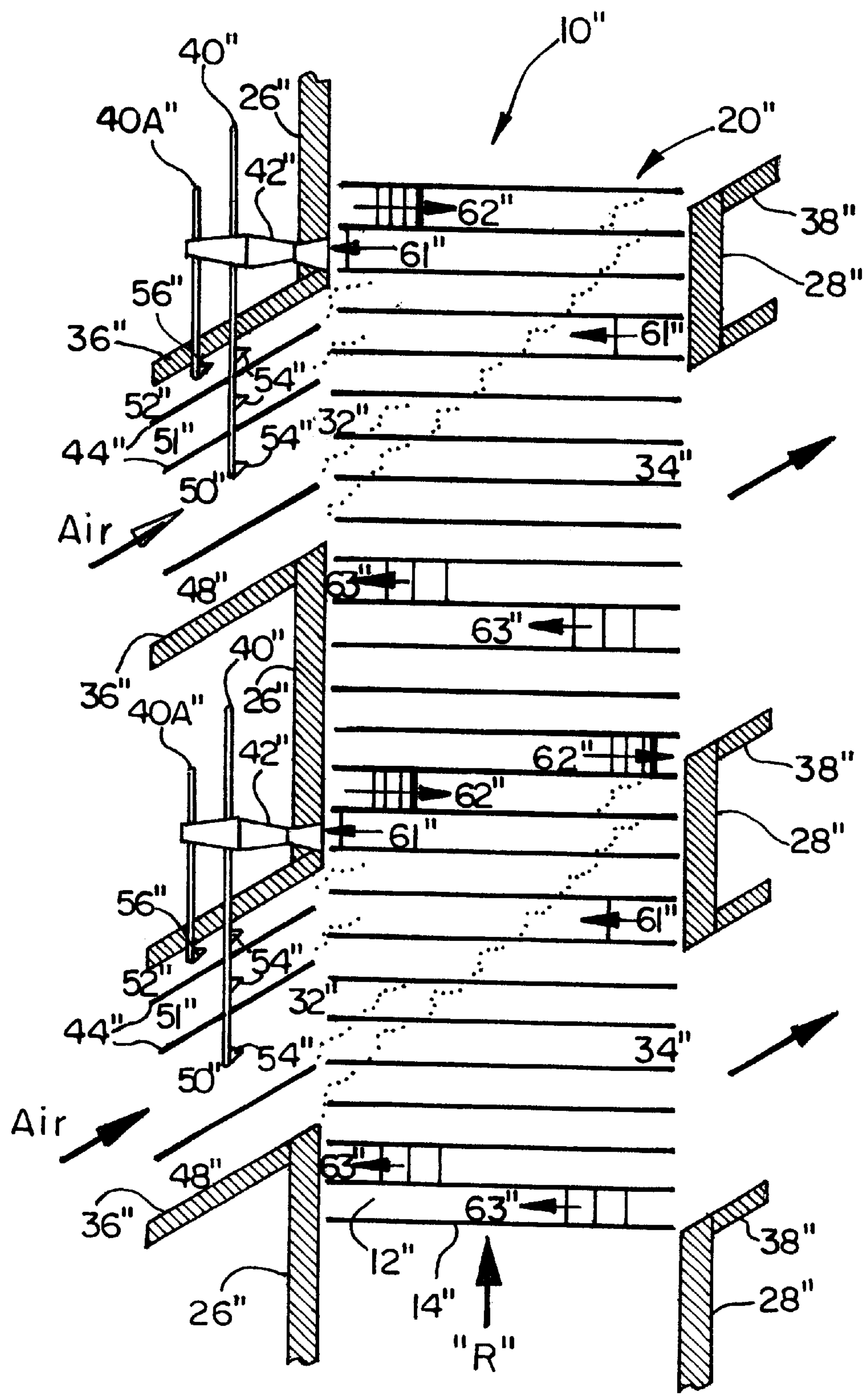
FIG. 6 illustrates a schematic developed view of a combustion wave rotor having two inlet ports and two exhaust ports.

FIG. 5A is a developed view taken through the combustion chambers 12 showing the combustion wave rotor 10 for detonative combustion. The partial-annular ports 32, 34 are shown in circumferential section. The combustion chambers 12 appear as a horizontally stacked array, and the rotation of the combustion chambers appears as translation along the direction "R". The combustion chambers 12 move from the bottom to the top of the figure upon rotation. For simplicity, the schematic diagram of FIG. 5A illustrates the configuration of this invention designed for only one combustion cycle per revolution having only one inlet port 32 and one exhaust port 34. Similarly, FIG. 5B is a developed view taken through the combustion chambers 12' showing a combustion wave rotor 10' for deflagrative combustion.

FIG. 6 illustrates a preferred configuration having two inlet ports 32 and two exhaust ports 34. FIG. 7 illustrates a preferred configuration where the combustion chambers 12''' are helically disposed with respect to a longitudinal axis of the rotor 20'''. In a developed view, as shown in FIG. 7, the pitch of the helix of the combustion chambers 12''' is represented by the slope of the combustion chamber walls. In a preferred helical configuration, the pitch of the helix is such that combustion chambers 12''' are slanted downward from the inlet port 32''' towards the exhaust port 34''' in a developed view, where the direction of rotation is in the upward direction.

In the deflagrative configuration containing one inlet port 32' and one exhaust port 34',as shown in FIG. 5B, the inlet port 32' and exhaust port 34' each has a circumferential extent subtending about 120 degrees. Each port respectively communicates with one-third of the combustion chambers 12' at any instance. Typically, for a deflagrative configuration, the inlet port is circumferentially offset by about 60 degrees downstream with respect to exhaust port 34' in the rotation direction "R".

For a detonative configuration, such as shown in FIG. 5A, the circumferential extent of the inlet and outlet ports 32, 34 would be about 180 degrees, and therefore each port communicates with about one-half of the combustion chambers 12 at any instance. Typically, for a detonation configuration, the inlet port 32 is circumferentially offset by about 90 degrees downstream with respect to the rotation direction "R" from the exhaust port 34.

In general, for deflagrative or detonative combustion it is preferred that an inlet port 32 and paired exhaust port 34, having substantially equal circumferential extent, are circumferentially offset from one another by about one-half of their circumferential extent, with the inlet port 32 being downstream from the exhaust port 34.

In the alternate detonative configuration, as shown in FIG. 6, having two inlet ports 32'' and two exhaust ports 34'', each port subtends a circumferential extent of about 90 degrees, and each inlet port 32'' and paired exhaust port 34'' is circumferentially offset from one another by about 45 degrees. Additional configurations having more inlet and exhaust ports and having the same relative proportions and locations are possible. In an alternate detonative configuration, the combustion wave rotor may have one exhaust port which subtends a full annulus of 360 degrees (the exhaust port is in simultaneous communication with all of the combustion chambers) and may have one or more inlet ports that subtend a total combined circumferential extent of about 240 degrees thereby communicating with about two-thirds of the combustion chambers.

For either the deflagrative or detonative configurations, an inlet duct 36 for receiving air and delivering air and combustible materials to the inlet port 32 is connected to the first end wall 26 communicating with the inlet port 32. An exhaust duct 38 for discharging combustion products is connected to the second end wall 28, communicating with the exhaust port 34. The inlet duct may be attached perpendicular to the first end wall. Alternately, the inlet duct 36, 36', 36'' may be attached to the first end wall 26, 26', 26'', at an angle as shown in FIGS. 5A, 5B and 6.

Figure 4:
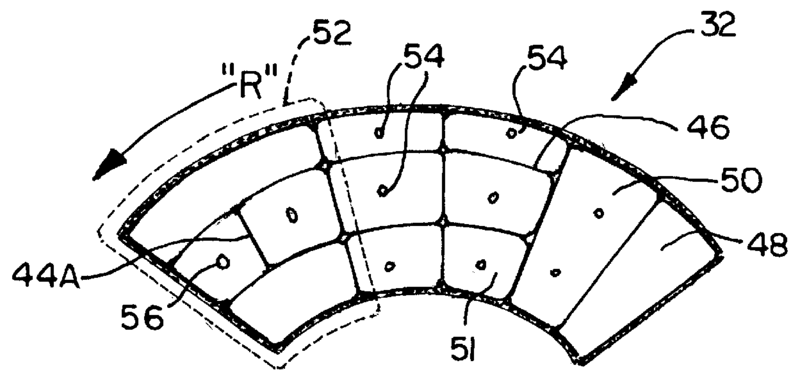
FIG. 4 illustrates a schematic transverse cross-sectional view of the inlet duct taken along 4—4 in FIG. 2.
Figure 8A:
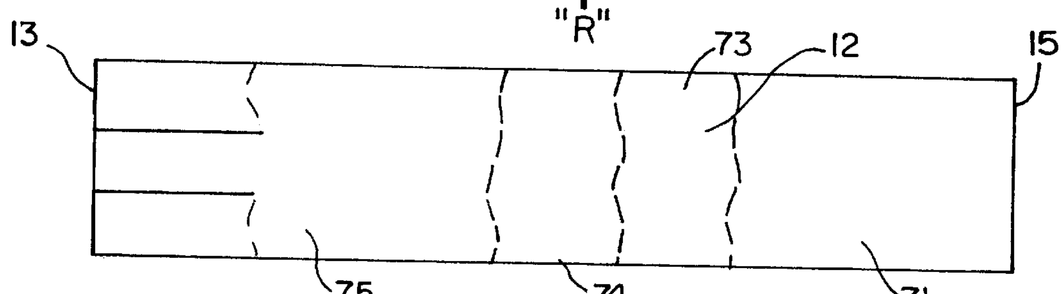
FIGS. 8A and 8B illustrate a longitudinal cross-sectional view of a combustion chamber showing stratification of air and fuel mixtures within the chamber.
Figure 8B:
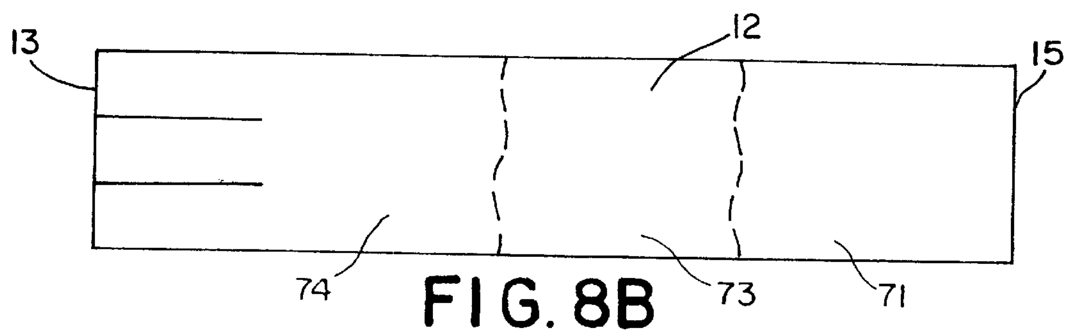

As shown in FIG. 5A and for analogous structures in FIGS. 5B, 6, and 7, the inlet duct 36 is partitioned into several inlet zones 48, 50, 52 for pre-mixing air and combustible materials of varying concentrations and introducing such materials into the combustion chambers 12 in a stratified manner as generally depicted in FIGS. 8A and 8B. The inlet zones may extend the full radial height of the annular region 19, depicted by inlet zone 48 in FIG. 4. At least a portion of the inlet zones, however, are divided in the radial direction by circumferential inlet partitions 46, as best seen in FIG. 4. Additionally, the circumferential inlet partitions 46 as shown in FIG. 2 may extend into the inlet port 32. The circumferential inlet partitions 46 may be located in registration with corresponding circumferential rotor partitions 16. Division of the inlet zones along the radial direction by circumferential inlet partitions 46 permits differential charging of the combustion chamber 12 along the radial direction. For example, the inlet zones radially proximal to the hub 18 and shroud 22 may provide only non-combustible materials to corresponding regions of the combustion chambers 12, thus deterring leakage of hot combustible gas from the inlet side of the rotor 20 and helping to cool the rotor 20. This radial stratification may also minimize thermal damage of the bearings 24 and other components of the wave rotor 10 as well as provide a further level of control of the rotor temperature and the temperature gradient.

Inlet duct vanes 44 are disposed within the inlet duct 36 to create the inlet zones 48, 50, 51, 52. Preferably at least three inlet duct vanes 44 are used creating at least four inlet zones 48, 50, 51, 52. The inlet duct vanes 44 may be equally spaced within the inlet duct 36, thus creating inlet zones 48, 50, 51, 52 some of which have equal circumferential width. Alternatively, the inlet zone spacing may be unequal such as zones 48, 50 and 51 relative to zone 52, as shown in FIG. 4. In a selected configuration, the inlet zones have the same circumferential width as the circumferential width of the combustion chambers 12. The air and combustible materials are drawn into the combustion chambers 12 by the action of an expansion wave 63 which is discussed below in connection with the detonative combustion cycle timing. The stratification is chosen to aid in establishing proper conditions for deflagrative or detonative combustion as desired.

For the deflagrative configuration shown FIG. 5B, a first inlet zone 48' is located at a leading edge of the inlet port 32' such that the combustion chambers 12' encounter the first inlet zone 48' before any other inlet zones as the combustion chambers 12' rotate past the inlet port 32'. For deflagrative combustion, the first inlet zone 48' preferably introduces air and combustible materials into the inlet end 13' of a representative combustion chamber 12' forming a combustible region within the representative combustion chamber 12'. This combustible region comes into contact with residual hot combustion product gases present in the combustion chambers 12', which provides a means of ignition of the combustible region after inflow. The concentration of combustible material delivered to the combustion chamber 12' is controlled by the discharge rate of fuel from a first fuel injector 54'. The first fuel injector 54' is fed by fuel line 40' which is connected to an appropriate fuel source such as a hydrocarbon fuel or hydrogen.

The volume of combustible materials introduced into the representative combustion chamber 12',and thus the width of the combustible layer, is governed by the flow rate of material into the representative chamber 12' and the rate of rotor rotation relative to the circumferential width of the first inlet zone 48'. The spacing of the inlet vane 44' that defines the circumferential width of the first inlet zone 48' is selected with regard to the rotor rotation rate and flow rate to create a combustible layer of sufficient volume.

A first intermediate inlet zone 50' is positioned adjoined the first inlet zone 48' includes a second fuel injector 54' for injecting fuel into the intermediate inlet zone 50'. The second fuel injector 54' is fed by fuel line 40'. The first intermediate inlet zone 50' is located adjacent to the first inlet zone 48' such that the representative combustion chamber 12' will successively encounter the first intermediate inlet zone 50' after the first inlet zone 48',as determined by the direction of rotation R. Thus, the first intermediate inlet zone 50' delivers a combustible material to the representative combustion chamber 12' adjacent to the initial combustible layer. The concentration of combustible material delivered to the combustion chamber 12' is controlled by the discharge rate of fuel from second fuel injector 54'. The volume of combustible material introduced into the representative combustion chamber 12' is governed by the flow rate of combustible material into the representative chamber 12' and the rate of rotor rotation relative to the circumferential width of the first intermediate inlet zone 50'. The spacing of the inlet vane 44' that defines the circumferential width of the first intermediate inlet zone 50' is selected with regard to the rotor rotation rate and flow rate to create a combustion layer of sufficient volume. Additionally, intermediate inlet zone 50' may be divided radially, similar to the circumferential inlet zone partitions 46' into sub-zones shown in FIG. 4, permitting differing mixtures to be charged from each radial sub-zones. For example, only air may be charged by the radially outermost and innermost sub-zone. Each sub-zone may have its own fuel injector 54' or may have no fuel injector as desired.

The inlet duct 36' may also contain a second intermediate inlet zone 51' disposed adjacent to the first intermediate inlet zone 50', and additional intermediate inlet zones may be created in the inlet duct 36' by the use of additional inlet duct vanes 44'. Typically, for deflagrative combustion, at least one intermediate inlet zone introduces air or a substantially air mixture into the combustion chamber 12' to create a buffer layer internal to the combustion chamber 12'. Typically, subsequent intermediate inlet zones 50' would introduce combustible materials into the combustion chamber 12' after the buffer layer, to create stratification of the type shown in FIGS. 8A and 8B.

The last inlet zone 52' is located adjacent to the final intermediate inlet zone (the second intermediate inlet zone 51' in the configuration of FIG. 5B) and adjacent to a trailing edge of the inlet port 32' such that the combustion chambers 12' encounter the last inlet zone 52' before the combustion chambers 12' rotate beyond the inlet port 32'. The last inlet zone 52' is radially divided, similar to the circumferential inlet zone partitions 46 into sub-zones, as shown in FIG. 4, permitting differing mixtures to be charged from each radial sub-zones. For example, only air may be charged by the radially outermost and innermost sub-zones. The radially central sub-zone of the last inlet zone 52' includes a fuel injector 54' attached to the fuel line 40', the fuel injector 54' operating in a similar manner to the other fuel injectors 54'. The quantity and composition of the combustible material introduced by the last inlet zone 52' may be designed to promote an ignition that causes deflagrative combustion.

While the present invention is particularly well-suited to deflagrative combustion, the present invention may also be used for detonative combustion as shown in the configuration of FIG. 5A. In particular, for detonative combustion, the first inlet zone 48 preferably introduces air and no combustible materials into the inlet end 13 of a representative combustion chamber 12 forming a noncombustible region within the representative combustion chamber 12. As shown in FIGS. 8A and 8B, this noncombustible region provides a buffer layer 73 to isolate any previously existing hot gases 71 that may be present within the representative combustion chamber 12 thus inhibiting any subsequent combustible materials introduced into the representative combustion chamber 12 from prematurely igniting. The volume of air introduced into the representative combustion chamber 12, and thus the width of the buffer layer 73, is governed by the flow rate of air into the representative chamber 12 and the rate of rotor rotation relative to the circumferential width of the first inlet zone 48. The spacing of the inlet vane 44 that defines the circumferential width of the first inlet zone 48 is selected with regard to the rotor rotation rate and air flow rate to create a buffer layer of sufficient volume.

A first intermediate inlet zone 50 is positioned adjoined the first inlet zone 48 includes a first fuel injector 54 for injecting fuel into the intermediate inlet zone 50. The first fuel injector 54 is fed by fuel line 40 which is connected to an appropriate fuel source such as a hydrocarbon fuel or hydrogen. The first intermediate inlet zone 50 is located adjacent to the first inlet zone 48 such that the representative combustion chamber 12 will successively encounter the first intermediate inlet zone 50 after the first inlet zone 48, as determined by the direction of rotation R. Thus, the first intermediate inlet zone 50 delivers a combustible material layer 74, as seen in FIGS. 8A and 8B, into the representative combustion chamber 12 adjacent to the initial buffer layer 73. The concentration of combustible material delivered to the combustion chamber 12 is controlled by the discharge rate of fuel from first fuel injector 54. The volume of combustible material introduced into the representative combustion chamber 12 is governed by the flow rate of combustible material into the representative chamber 12 and the rate of rotor rotation relative to the circumferential width of the first intermediate inlet zone 50. The spacing of the inlet vane 44 that defines the circumferential width of the first intermediate inlet zone 50 is selected with regard to the rotor rotation rate and flow rate to provide a combustible material layer 74 of sufficient volume. Additionally, intermediate inlet zone 50 may be divided radially by circumferential inlet zone partitions 46 into sub-zones, as shown in FIG. 4, permitting differing mixtures to be charged from each radial sub-zones. For example, only air may be charged by the radially outermost and innermost sub-zone. Each sub-zone may have its own fuel injector 54 or may have no fuel injector as desired.

The inlet duct 36 may also contain a second intermediate inlet zone 51 disposed adjacent to the first intermediate inlet zone 50. For detonative combustion it contains a second fuel injector 54 connected to fuel line 40. The second intermediate inlet zone 51 is configured to deliver a second combustible material layer 75, as seen in FIG. 8A, to the representative combustion chamber 12 as the representative combustion chamber rotates into registry with the second intermediate inlet zone 51. The configuration and design considerations of the second intermediate inlet zone 51 are analogous to the considerations of the first intermediate inlet zone 50 discussed above. Additional intermediate inlet zones may be used in the inlet duct 36 by the use of additional inlet duct vanes 44.

The last inlet zone 52 is located adjacent to the final intermediate inlet zone (the second intermediate inlet zone 51 in the configuration of FIG. 5A) and adjacent to a trailing edge of the inlet port 32 such that the combustion chambers 12 encounter the last inlet zone 52 before the combustion chambers 12 rotate beyond the inlet port 32. The last inlet zone 52 is radially divided by circumferential inlet zone partitions 46 into sub-zones, as shown in FIG. 4, permitting differing mixtures to be charged from each radial sub-zone. For example, only air may be charged by the radially outermost and innermost sub-zone. The radially central sub-zone of the last inlet zone 52 includes a fuel injector 54 attached to the fuel line 40, the fuel injector 54 operating in a similar manner to the other fuel injectors 54. In addition, the last inlet zone 52 optionally includes an enhancement injector 56 attached to enhancer line 40A for injecting a combustion enhancer into the last inlet zone 52. Thus, the last inlet zone 52 introduces combustible materials along with a combustion enhancer into the inlet end 13 of the representative combustion chamber 12 forming a region particularly susceptible to combustion ignition. The combustion enhancer may be an oxidant, a fuel, or a chemical enhancer known for use in combustion processes. The quantity of combustible material introduced into the representative combustion chamber 12 is governed by the same considerations discussed above. In particular, the quantity and composition of the combustible material introduced by the last inlet zone 52 may be designed to promote an ignition that causes detonative combustion.

Both the deflagrative and detonative configurations include an ignition source. For the deflagrative configuration of FIG. 5B, a preferred ignition source is in the form of a passage or a channel 43' created in end wall 26' that causes feedback of hot combustion products from the previously ignited combustion chambers. A second preferred ignition source is in the form of spark generators mounted in a recess in end wall 26'.

For the detonative configuration of FIG. 5A, the combustion wave rotor 10 further includes an igniter 42 preferably mounted in the first wall 26 proximal to the last inlet zone 52. Preferably, where there is more than one inlet port 32, separate igniters 42 are provided proximal to each inlet port 32, FIG. 6.

A first preferred ignition device 42 for detonative combustion, as depicted in FIGS. 5A and 6, is a continuous-flow chemical reaction chamber similar to a rocket engine chamber. It is supplied with fuel from feed line 40 and with oxidant from feed line 40A. It may incorporate an injection nozzle designed for supersonic injection of hot gas deep into the main combustion chambers 12. An alternative detonative or deflagrative configuration of the ignition device 42 uses atmospheric air as an oxidant instead of a stored oxidant. Another configuration of the ignition device 42, applicable to a non-reusable flight vehicle, burns solid rocket fuel stored within the ignition device 42 to produce hot ignition gas for the main combustion chambers 12.

Yet another configuration of the ignition device 42, suitable for either deflagrative or detonative combustion, generates a beam of electromagnetic radiation, including, but not limited to laser light or microwave radiation, which is focused into the rotating combustion chambers through a window in end wall 26 of the combustion wave rotor 10. As an alternative arrangement, the ignition device 42 may be located in the second wall 28 with the stratification scheme described above altered so that a region of combustible materials suited to ignite combustion is located proximal to the outlet end 15 of the combustion chambers 12 at the second wall 28.

The combustion wave rotor 10 optionally includes a motor 66 operably connected to the rotor 20 for rotating the rotor. Preferably the combustion wave rotor 10 includes a CPU 68 for operably controlling the fuel injectors 54, the motor 66, the igniter 42, and the enhancement injector 56. The CPU controls the operating speeds, flow rates, and timing of the applicable elements to control the combustion process pursuant to the method of this invention.

Figure 9A:
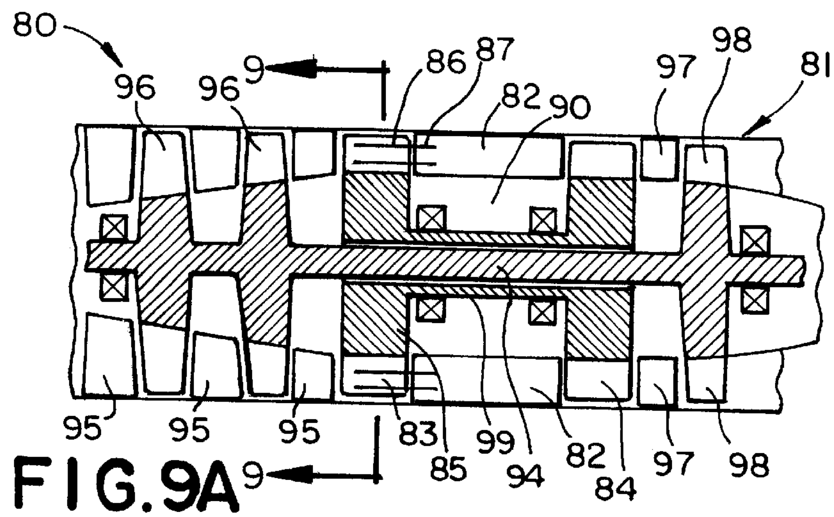
FIG. 9A illustrates a longitudinal cross-sectional view of a valved combustor.
Figure 9B:
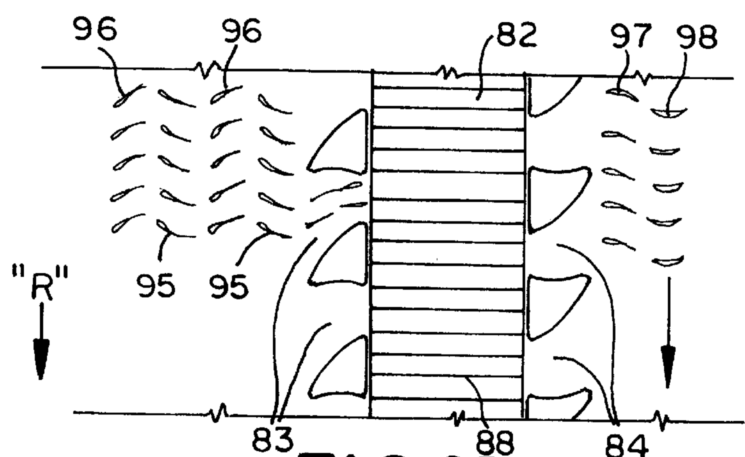
FIG. 9B illustrates a developed view of a valved combustor.
Figure 10:
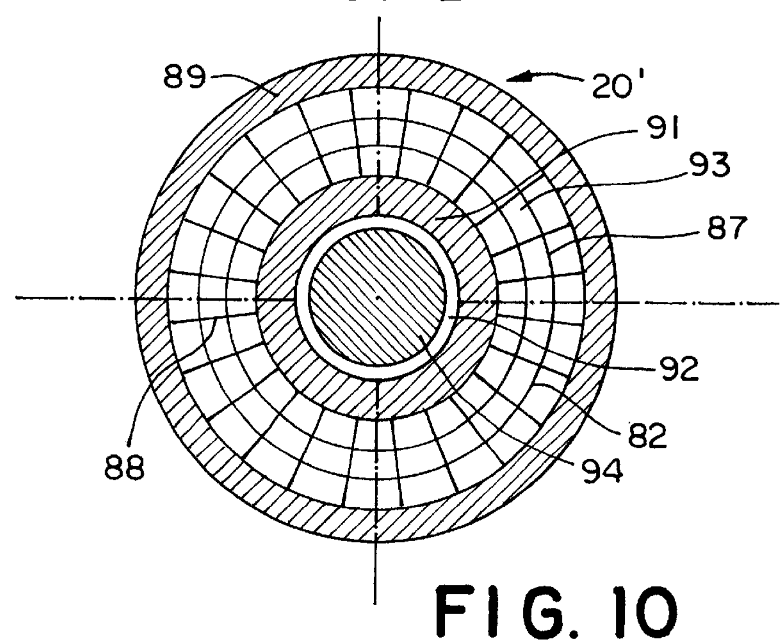
FIG. 10 illustrates a schematic transverse cross-sectional view of the combustion chambers taken through 9—9 in FIG. 9A.

An alternate embodiment of a partitioned multi-channel combustor, a rotary-valved combustor 80, is shown in FIGS. 9A and 9B as part of a gas turbine engine. The rotary-valved combustor 80 includes a housing 81, a rotor 85, inlet valves 83 mounted on the rotor 85, outlet valves 84 mounted on the rotor 85, stationary combustion chambers 82, and one or more igniters . The rotary-valved combustor 80 provides pressure-gain combustion, similar to a combustion wave rotor. However, the rotary-valved combustor 80 differs significantly from wave rotors in that the combustion chambers 82 of the rotary-valved combustor 80 are stationary, while the inlet valves 83 and outlet valves 84, or ducts, rotate. The relative motion of the inlet valves 83 and outlet valves 84 with respect to the combustion chambers 82 is similar to that of the combustion wave rotor 10 described above. This similar relative motion permits a stratified filling of the combustion chambers 82 with air and combustible materials for either detonative or deflagrative combustion similar to the combustion wave rotor 10. The rotary-valved combustor 80 includes a large number of stationary combustion chambers 82 arranged contiguously in an annulus, as shown in FIG. 10. The combustion chambers 82 are formed by vanes 88 extending radially from an annular hub 91 to the outer shroud 89 as shown in FIG. 10, so that the combustion chambers 82 extend longitudinally along the axis of rotation of the rotor 85. Optionally, the stationary combustion chambers 82 may be curved in an analogous fashion to the chambers 12*a* of FIG. 2A. The circumferential partitions 87 extend only partially into the combustion chamber 82 as best seen in FIG. 9A. The radial vanes 88 may be straight, as shown in FIG. 10, or may be curved, analogous to the wave rotor example shown in FIG. 7. The curved vanes may be helically curved to create combustion chambers 82 that are helically disposed with respect to the axis of rotation of the rotor 85.

Other combustion chamber cross sectional shapes are possible such as shown in FIG. 2A, discussed above. Preferably, the radial height of the annular region containing the combustion chambers 82 is 20% to 40% of the combustion chamber assembly 90 radius. Preferably, at least 15 chambers 82 are disposed about the circumference of a given annular region.

In the case of the valved combustor 80, the stationary combustion chambers 82 are attached to the housing 81. Fixed compressor blades 95 and fixed turbine blades 97 are attached internally to the housing 81. The rotor 85 includes inlet valves 83 and outlet valves 84 as shown in FIG. 9B. The inlet valve 83 consists of a disk attached to a shaft 99 in which one or more partial-annular passages are provided with an aerodynamically contoured shape. The exhaust valve 84 consists of another disk in which one or more partial-annular passages are provided with an aerodynamically contoured shape. FIG. 9A also shows, in hatched section, an optional distinct and separate rotor shaft 94 on which are mounted rotating compressor blades 96 and rotating turbine blades 98 for conventional gas turbine operation. The rotating compressor blades 96 together with corresponding fixed compressor blades 95 provide upstream compression of air to be supplied to the valved combustor 80. The rotating turbine blades 98 and corresponding fixed turbine blades 97 receive pressurized combustion product gas from the valved combustor 80, from which they generate motive power.

The combustion chamber assembly 90 and housing 81 are formed of metal or other materials known in the manufacture of valved combustors and gas turbine combustors. However, the materials of the combustion chamber assembly 90, housing 81, and vanes 88 for use in the rotary-valved combustor 80 must be chosen to withstand the combustion process. Preferably, the vanes 88 are integrally formed with the annular hub and shroud. The combustion chambers 82 may be formed by removal of material, such as by boring the combustion chambers 82. Alternately, the combustion chamber assembly 90 and combustion chambers 82 may be formed by an extrusion, casting, or welding process.

The annular hub may include an open interior through which optional rotor shaft 94 passes. The rotating inlet valves 83 and outlet valves 84 are mounted on a single rotor 85 at respective ends of the rotor shaft 99. The inlet valves 83 include circumferential partitions 86 in the inlet valve 83 analogous to the circumferential inlet partitions 46 of the combustion wave rotor 10. Additionally, the combustion chambers 82 may include circumferential partitions 87 to divide the combustion chambers 82 in the radial direction to permit radial stratification of air and combustible materials. The combustion chamber circumferential partitions 87 extend only partially into the inlet end of the combustion chamber 82 as shown in FIG. 9A.

The number and relative locations of the inlet and exhaust ports 83, 84 and their functional relationship with the events occurring in the combustion chambers 82 are analogous to the combustion wave rotor, as discussed above, where the viewpoint of the description is changed from the stationary to the rotating observer.

Figure 11:
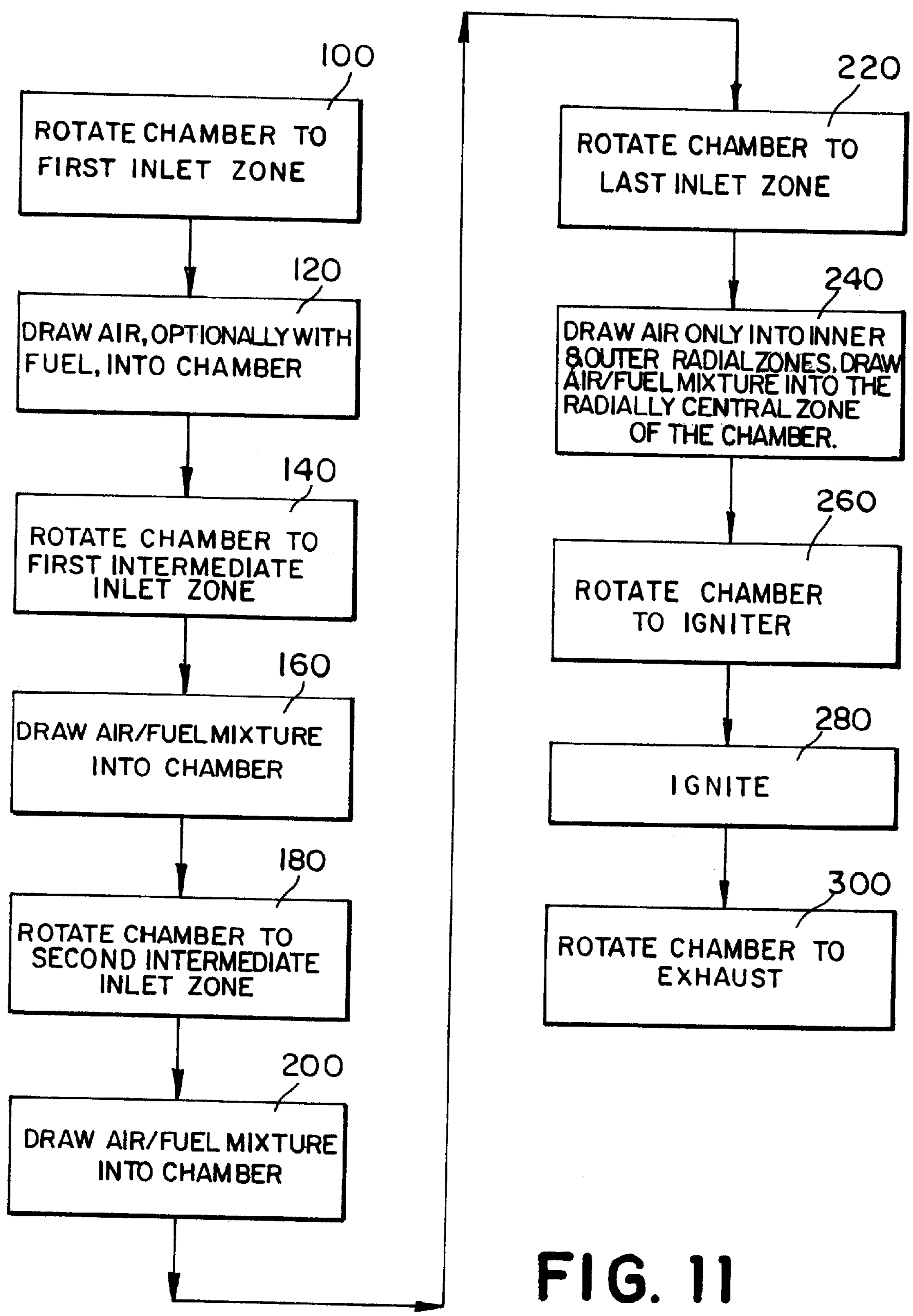
FIG. 11 illustrates a flowchart of a method of operation of a combustion wave rotor.

The method for operating a combustion wave rotor 10 is schematically illustrated in the flow cycle diagram of FIG. 11 which corresponds to the configurations of the wave rotor shown in FIGS. 5A and 5B. For simplicity, the schematic diagrams of FIGS. 5A and 5B illustrate a canonical configuration having only one inlet port 32, 32' and one exhaust port 34, 34'. The detonative configuration of FIG. 5A is designed for operation at one combustion cycle per revolution. The deflagrative configuration of FIG. 5B need not fully complete combustion within the chamber in a single cycle of revolution. In alternative arrangements, a combustion wave rotor may be provided that, in a single revolution of its rotor, completes multiple full cycles of combustion.

Beginning at the bottom of the diagram of FIG. 5A (or 5B) the internal processes and external interactions of a representative chamber 12 are now described, it being understood that all combustion chambers 12 experience the same processes sequentially and cyclically, but at different times. The pressurized, hot combustion gases produced by a previous combustion process exit from a combustion chamber 12 into the exhaust duct 38, resulting in an expansion wave 63 which travels from the outlet end 15 of the combustion chamber 12 towards the inlet end 13 of the combustion chamber 12. The expansion wave 63 arrives at the inlet end 13 of the combustion chamber 12 just as the combustion chamber 12 rotates into communication with the first inlet zone 48 of inlet port 32 at step 100 of FIG. 11. The resulting depression of pressure causes air to be drawn into the combustion chamber 12 from the first inlet zone 48 at step 120. In the detonation mode, the first inlet zone 48 contains non-reactive air to create a sufficient buffer layer of air within the combustion chamber 12 which inhibits the hot gases in the combustion chamber 12 from prematurely igniting subsequently admitted fuel-air mixtures. The volume of air drawn into the combustion chamber 12, defining the width of the buffer layer, is dictated by the flow rate of air into the combustion chamber 12 and the rate of rotor rotation relative to the circumferential width of the first inlet zone 48. In the deflagrative mode, the first inlet zone 48' may supply a reactive mixture to be ignited by residual hot gas.

The rotor 20 continues its rotation bringing combustion chamber 12 into communication with the first intermediate inlet zone 50 at step 140. A combustible mixture of fuel and air is drawn into the combustion chamber 12 from first intermediate inlet zone 50 at step 160. The combustible mixture is created by injecting a fuel through injector 54 from fuel line 40 into the first intermediate inlet zone 50. The concentration of combustible material delivered to the combustion chamber 12 is controlled by the discharge rate of fuel from the first fuel injector 54. The volume of combustible material introduced into the representative combustion chamber 12 is governed by the flow rate of combustible material into the representative chamber 12 and the rate of rotor rotation relative to the circumferential width of the first intermediate inlet zone 50.

The rotor 20 continues its rotation bringing the combustion chamber 12 into communication with the second intermediate inlet zone 51 at step 180. A second combustible mixture of fuel and air is drawn into the combustion chamber 12 from second intermediate inlet zone 51 at step 200. The concentration and quantity of combustible mixture produced is dictated by the same considerations discussed above in regard to the first intermediate inlet zone 50, except that the concentration and quantity of the combustion mixture produced at the second intermediate inlet zone 51 may be different relative to the first intermediate inlet zone. In the deflagrative mode the second intermediate inlet zone 51' may provide air substantially free from combustible material.

The rotor 20 continues its rotation bringing the combustion chamber 12 into communication with the last inlet zone 52 at step 220. The last inlet zone 52 has circumferential partitions 46 that allow non-reactive air to be drawn into the radially innermost and radially outermost zones of combustion chamber 12. The last inlet zone 52 may, in addition to mixing fuel and air in the radially central zone, admix from feed line 40A a combustion enhancer such as an oxidant or another substance that can enhance the initiation of a detonation or deflagration. This enhanced mixture is drawn into the combustion chamber 12 at step 240.

The rotor 20 continues its rotation bringing the combustion chamber 12 into communication with the igniter 42 for detonation, or with ignition passage 43' for deflagration, at step 260. Detonation in the chamber is initiated shortly after experiencing closure of the inlet port 32, at step 280, by injecting hot gases into the combustion chamber from an ignition device 42. The closure of the inlet port 32 momentarily produces a depression of pressure in the gases near the inlet end 13 of the combustion chamber 12 which will aid the injection of ignition gases. The combustible mixtures are ignited by an ignition device 42, thus producing a detonation wave 62 (or deflagration wave 65 for deflagrative combustion) which combusts the mixtures and accelerates the gases in the combustion chambers towards the exhaust port 34.

During an initial portion of the period of time that the combustion chamber 12 accepts inflowing mixtures from the inlet port 32, the combustion chamber 12 moves in registry with the exhaust port 34 communicating with the outlet end 15 of the combustion chamber 12. The abrupt closure of the outlet end 15 of the combustion chamber 12 causes a compression wave 61 to develop in the gas at the outlet end 15 of the combustion chamber 12. The compression wave 61 travels towards the inlet end 13 of the combustion chamber 12 and progressively causes inflowing gases to stop their motion towards the outlet end 15 of combustion chamber 12. The relative circumferential locations of the exhaust port 34 and ignition device 42 are arranged so that this compression 61 arrives at the first end wall 26 immediately after the injection of ignition gases. Reflection of the compression wave 61 off of the first end wall 26 accelerates the formation of the detonation wave 62 (or deflagration wave 65 for deflagrative combustion), which combusts all the -combustible mixtures in the combustion chamber 12 as the detonation wave 62 moves rapidly towards the second wall 28. In the case of deflagration, not all the mixture may be combusted in one cycle duration. In the detonation process, the detonation wave 62 arrives at the outlet end 15 of the combustion chamber 12 as the combustion chamber 12 rotates into registry with the exhaust port 34 at step 300. The gases accelerated by the detonation wave 62 are expelled into the exhaust duct 38. Steps 100 through 300 are repeated cyclically and sequentially for each combustion chamber 12. As shown in FIG. 6, multiple combustion cycles can be effected for each single revolution of the rotor by providing multiple inlet and exhaust ducts 36" and 38", respectively.

EXAMPLES

The behavior of the circumferentially partitioned wave rotor 10 can be predicted by a computational model. In this model it is assumed that the wave rotor 10 is coupled to a compressor and turbine, which are placed at the wave rotor inlet end 13 and outlet end 15, respectively. Turbine inlet static pressure for this simulation is 4.6e5 Pa.

In the following examples, a two-dimensional model is used for efficiently computing the transient flow and combustion processes of the wave rotor 10. The two-dimensional model accounts for the effect of circumferential rotor partitions 16; however, the effects of rotor vanes 14 in the wave rotor 10 are not accounted for in the model. In the calculations presented, the fuel is not allowed to burn completely.

Figure 12:
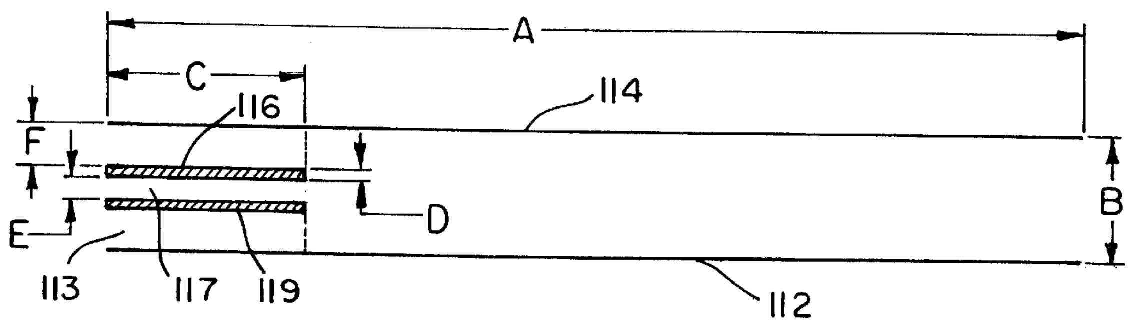
FIG. 12 illustrates a schematic transverse cross-sectional view of a combustion chamber having two circumferential partitions extending partially into the chamber.

The dimensions of the modeled internal combustion chamber 112 are shown in FIG. 12. The combustion chamber 112 has a length, A, of 40 cm and a height, B, of 5 cm. Two circumferential rotor partitions 116, 119 are located near the inlet end 113 of the combustion chamber 112 and extend 8 cm, C, into the combustion chamber 112 parallel to the longitudinal axis of the combustion chamber 112. The circumferential rotor partitions 116, 119 have a height, D, of 0.4 cm and are spaced apart from one another by 1 cm, E. The region between the two circumferential rotor partitions 116, 119 provides a fuel injection partition region 117. The upper circumferential rotor partition 116 is disposed 1.7 cm, F, from the upper wall 114 of the combustion chamber 112.

Turbulent combustion is modeled via a modified version of the eddy-dissipation model of Magnussen et al., 16th Symposium (International) on Combustion, Combustion Institute, Pittsburgh, p 719. The model is applicable to both premixed and nonpremixed systems. The model is modified to provide a reaction time scale, $T_R$ that is calculated as the sum of turbulent kinetic, $k/\epsilon$ and chemical kinetic, $\rho m_{lr}/R_{kin}$ time scales, where k is the turbulent kinetic energy, $\epsilon$ is the rate of dissipation of k, $\rho$ is density, and $m_{lr}$ is the mass fraction of the leading reactant i.e. fuel ($C_3H_8$) in the present model. This combined turbulent and chemical kinetic approach to calculation of the reaction time scale, $T_R$, prevents over prediction of reaction rates near wall regions. The mean fuel reaction rate follows from Equation (1).

$$R_F = \frac{\rho}{T_R} A_{ebu} \cdot \min\left[m_F, \frac{m_0}{s_0}, B_{ebu}\frac{m_P}{s_P}\right] \tag{1}$$

The eddy break up coefficients $A_{ebu}$ and $B_{ebu}$ are used to control strength of the source. The absolute value of $A_{ebu}$ can range between 2 to 10. The former value is used if the reaction rate is controlled by the consumption of a reactant and the later value is used if the reaction is controlled by the rate of formation of a product. In the present example, 4 and 0.5 are used for $A_{ebu}$ and $B_{ebu}$ respectively, which are the typical values.

$R_{kin}$ is the reaction rate, which is calculated from chemical kinetics using an Arrhenius type expression, as expressed in Equation (2). Propane ($C_3H_8$) is the fuel. For propane, constants in the rate equation (2) A=4.83E$^9$ (kmol/m$^3$)$^{l-m-n}$, $\beta$=0.0, $E_a$=1.26E$^8$ (kmol/J), m=0.1, n=1.65 are used. A single step global reaction is assumed where $CO_2$ and $H_2O$ are produced in the background of $N_2$.

$$R_{kin(C_3H_8)} = -AM_{C_3H_8}T^{\beta}\left[\frac{\rho m_{C_3H_8}}{M_{C_3H_8}}\right]^m\left[\frac{\rho m_{O_2}}{M_{O_2}}\right]^n e^{-E_a/RT} \tag{2}$$

In the present model, hot gas is introduced to the computational domain from a small surface at inlet end 113 to initiate combustion, using the inlet boundary conditions at a specified mass flow rate and chemical composition. The specifications of the hot gas injection can be found in Table 1.

TABLE 1

Injected Hot Gas Properties.

| | |
|---|---|
| Hot Gas Temperature (K) | 2278 |
| Injection Velocity (m/s) | 750 |
| Density (kg/m$^3$) | 2.6532 |
| Turbulent Kinetic Energy (m$^2$/s$^2$) | 1.500e4 |
| Turbulent Dissipation (m$^2$/s$^3$) | 1.308e9 |
| Concentration (kg/kg) | |
| $C_3H_8$ | 0.0 |
| Mixture Fraction | 0.0485619 |
| $O_2$ | 0.0441 |
| $CO_2$ | 0.1457 |
| $H_2O$ | 0.0795 |
| $N_2$ | 0.7307 |
| Injection Duration (s) | 6.5e-5 |

In the following examples, the initial fuel concentration in the combustion chamber 112 is not uniform. Three initial fuel configurations are considered. These non-uniform mixture distributions are achieved for example, by stratification in the inlet duct 36 as described above.

Figure 13:
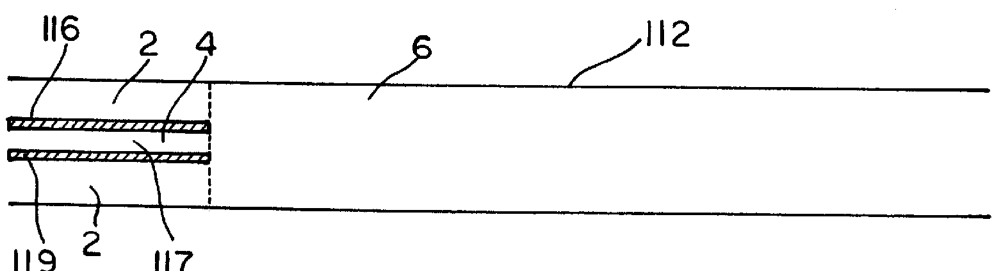
FIG. 13 illustrates the combustion chamber of FIG. 12 showing a first fuel distribution pattern within the chamber.

The baseline configuration of the fuel distribution is shown in FIG. 13, where inside the fuel injection partition region 117 a stoichiometric fuel/air mixture, 4, is provided. Above the upper circumferential rotor partition 116 and below the lower circumferential rotor partition 119, only air, 2, with no fuel is provided. The remaining part of the combustion chamber 112 is filled initially with a lean fuel/air mixture of 0.8 equivalence ratio, 6. Exemplary compositions of a five-component mixture for different equivalence ratios used are presented in Table 2.

TABLE 2

Initial Mixture Compositions in the Wave Rotor Combustion Chamber.

| | LEAN MIXTURE $\Phi = 0.8$ | STOICHIO-METRIC $\Phi = 1.0$ | COMBUSTION PRODUCTS |
|---|---|---|---|
| $C_3H_8$ | 0.04856 | 0.05997 | 0.0 |
| $O_2$ | 0.22074 | 0.21809 | 0.04410 |
| $CO_2$ | 0.0 | 0.0 | 0.14570 |
| $H_2O$ | 0.0 | 0.0 | 0.07950 |
| $N_2$ | 0.73068 | 0.72194 | 0.73070 |
| Temperature (K) | 600 | 600 | 2000 |

Figure 16:
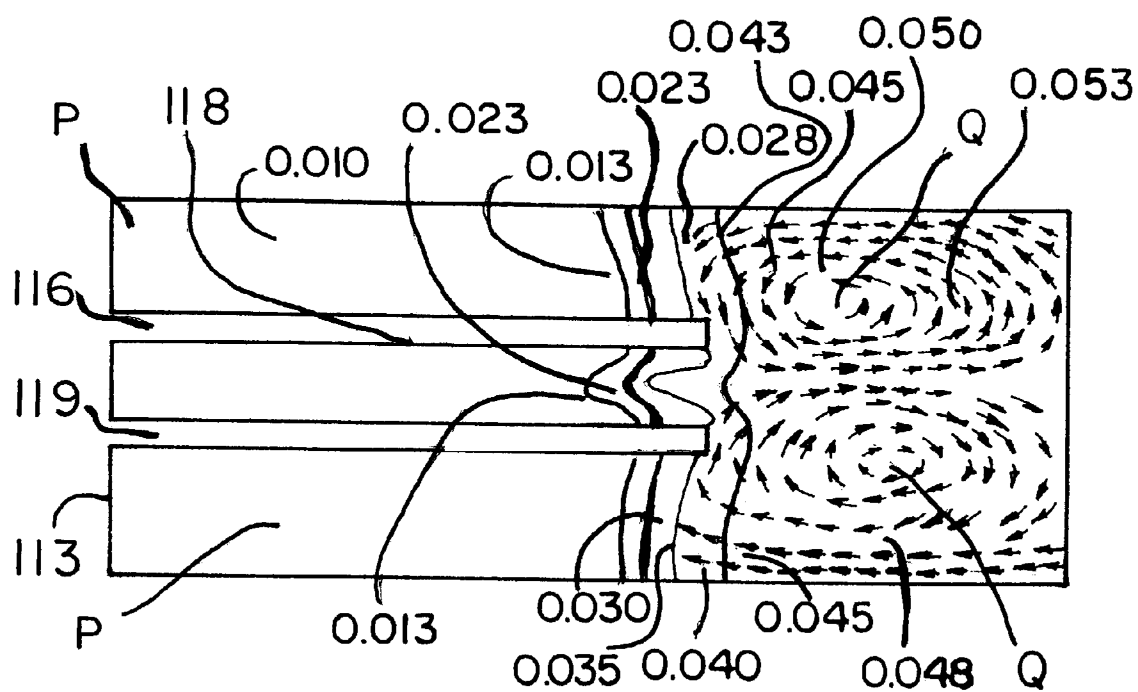
FIG. 16 illustrates computed velocity vectors and $C_3H_8$ concentration contours within the combustion chamber.

Analysis of the computational model for the fuel configuration of FIG. 13 shows that the circumferential rotor partitions 116, 119 reduce hot gas leakage from the inlet port 132 by producing a cold air buffer, as seen in FIG. 16. However, for the later stages of combustion, recirculation regions, Q, develop near the internal end 118 of the partitions 116, 119. The recirculation regions, Q, quench the combustion zone and reduce the reaction rate considerably by continuously introducing cold air from the buffer layers, P, as seen in FIG. 16. Reducing the extent of the cold air buffer, 2, as shown in FIG. 14, solves this recirculation problem.

Figure 14:
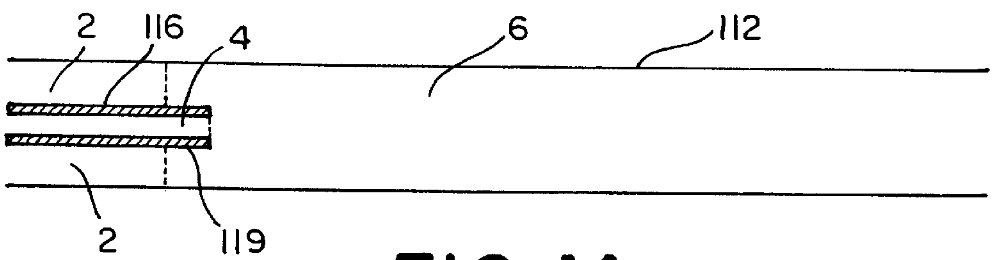
FIG. 14 illustrates the combustion chamber of FIG. 12 showing a second fuel distribution pattern within the chamber.
Figure 15:
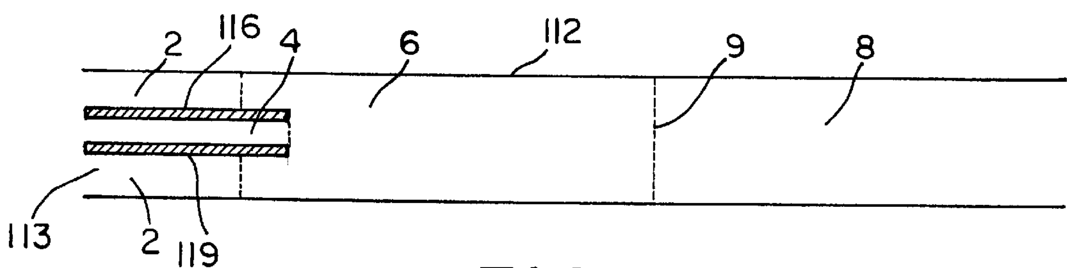
FIG. 15 illustrates the combustion chamber of FIG. 12 showing a third fuel distribution pattern within the chamber.

With the initial fuel configuration shown in FIG. 14 and hot gas ignition, the computational model reveals that a fairly one dimensional flame front propagates with high speed up to the longitudinal middle of the combustion chamber 112. The recirculation regions, Q, do not introduce cold air, and mixture 6 is successively combusted. Later, the combustion rate becomes considerably slower. This sharp slow down occurs approximately at the third millisecond, having slight variations in this value depending on the initial turbulence level and hot gas injection parameters. This slow burning process, which can be associated with the rapidly decaying initial turbulence level in the channel, is not desirable in existing practical wave rotor configurations. However, combustion can also start from the other channel end, initiated by the hot combustion products that remain from the previous combustion cycle. Such a configuration is especially suited to long channels with deflagrative, turbulent flame speeds. The dual initiation of combustion accelerates the combustion process and permits the use of a smaller initial charge which can be consumed in a shorter time. FIG. 15 shows an initial fuel and combustion products distribution for the dual ignition configuration. Fuel with a 0.8 equivalence ratio, 6, is provided in the half of the combustion chamber 112 nearest the inlet end 113. The remaining half of the combustion chamber 112 contains combustion products, 8, having a composition as listed in Table 2. The amount and location of combusted gases is determined so that overall fuel-air ratio is 0.02. The other parameters used in these calculations are presented in Table 1 and in Table 3.

TABLE 3

Initial Compressor Stagnation Conditions.

| | |
|---|---|
| Stagnation Pressure (Pa) | 7.6e5 |
| Stagnation Temperature (K) | 600 |
| Overall Fuel-Air Ratio ≈ | 0.02 |

Compared to the hot gas initiated combustion region, the reaction rate at the fuel/combustion gas interface, 9, is very slow.

On the basis of the above examples, a valve timing sequence given in milliseconds is proposed for a simple internal combustor wave rotor is presented in Table 4. Phases I, II and III are modeled in the above examples.

TABLE 4

Proposed Deflagration Cycle.

| PHASE | END | DESCRIPTION |
|---|---|---|
| I | 0.065 | Hot gas injection. |
| II | 3.865 | Constant volume combustion. |
| III | 4.585 | Exhaust to turbine. |
| IV | 4.615 | Exhaust to turbine starts. Cold air buffer is introduced from the fuel partition inlet. Lean mixture is introduced from the remaining regions (from top and bottom of the fuel partition) of the inlet port. |
| V | 4.815 | Exhaust to turbine. Lean mixture is introduced from all regions (from top and bottom of the fuel partition and through the fuel partition itself) of the inlet port. |
| VI | 4.995 | Exhaust port closed and shock-compression process starts. Lean mixture is introduced from all regions of the inlet port. |
| VII | 5.055 | Exhaust port still closed, shock compression process continues. Through the fuel partition inlet region pilot stoichiometric fuel-air mixture is introduced. Lean mixture is introduced from the remaining regions (from top and bottom of the fuel partition) of the inlet port. |
| VIII | 5.245 | Exhaust port still closed. Through the fuel partition inlet region pilot stoichiometric fuel-air mixture, from the remaining regions air is Introduced. Initial Fuel Distribution is finally obtained. |

These and other advantages of the present invention will be apparent to those skilled in the art from the foregoing specification. Accordingly, it will be recognized by those skilled in the art that changes or modifications may be made to the above-described configurations without departing from the broad inventive concepts of the invention. It should therefore be understood that this invention is not limited to the particular configurations described herein, but is intended to include all changes and modifications that are within the scope and spirit of the invention as set forth in the claims.

What is claimed is:

1. A combustion wave rotor comprising:

a housing having at least one inlet port;

a rotor mounted within the housing, the rotor comprising a plurality of combustion chambers disposed in the rotor, the chambers each having an inlet end for gaseous communication with the inlet port, the inlet end having a fuel partition injection region;

at least one inlet zone disposed within the inlet port, the inlet zone sized for introducing fuel into only the fuel partition injection region.

2. The combustion wave rotor according to claim 1 wherein the fuel partition injection region comprises two or more circumferential partitions disposed within the inlet end of the combustion chamber to partition the combustion chamber along the radial direction.

3. The combustion wave rotor according to claim 2 wherein the circumferential partitions form a region therebetween to provide the fuel partition injection region.

4. The combustion wave rotor according to claim 2 wherein the circumferential partitions longitudinally extend from the inlet end into the combustion chamber a distance less than the length of the combustion chamber.

5. The combustion wave rotor according to claim 1 wherein the fuel partition injection region extends into the combustion chamber a distance sufficient to provide a pilot ignition zone.

6. The combustion wave rotor according to claim 1 wherein the fuel partition injection region extends into the combustion chamber a distance to permit turbulent mixing within a portion of the combustion chamber in which the fuel partition injection region does not extend.

7. The combustion wave rotor according to claim 1 wherein the inlet port comprises two or more circumferential partitions.

8. The combustion wave rotor according to claim 7 wherein the circumferential partitions partition the inlet port along the radial direction.

9. The combustion wave rotor according to claim 7 wherein the circumferential partitions form a region therebetween to provide a first inlet zone sized for introducing fuel into only the fuel partition injection region.

10. The combustion wave rotor according to claim 1 wherein the at least one inlet zone includes a first inlet zone sized to communicate with the inlet end of the combustion chamber.

11. A rotary valved combustor comprising:

a housing comprising a rotor mounted within the housing;

at least one inlet valve mounted on the rotor;

a plurality of combustion chambers mounted within the housing, the chambers having an inlet end for gaseous communication with the inlet valve, the inlet end having a fuel partition injection region;

at least one inlet zone disposed within the inlet valve, the inlet zone sized for introducing fuel into only the fuel partition injection region.

12. The valved combustor according to claim 11 wherein the fuel partition injection region comprises two or more circumferential partitions disposed within the inlet end of the combustion chamber to partition the combustion chamber along the radial direction.

13. The valved combustor according to claim 12 wherein the circumferential partitions form a region therebetween to provide the fuel partition injection region.

14. The valved combustor according to claim 12 wherein the circumferential partitions longitudinally extend from the inlet end into the combustion chamber a distance less than the length of the combustion chamber.

15. The valved combustor according to claim 11 wherein the fuel partition injection region extends into the combustion chamber a distance sufficient to provide a pilot ignition zone.

16. The valved combustor according to claim 11 wherein the fuel partition injection region extends into the combustion chamber a distance to permit turbulent mixing within a portion of the combustion chamber in which the fuel partition injection region does not extend.

17. The valved combustor according to claim 11 wherein the inlet valve comprises two or more circumferential partitions.

18. The valved combustor according to claim 17 wherein the circumferential partitions partition the inlet valve along the radial direction.

19. The valved combustor according to claim 17 wherein the circumferential partitions form a region therebetween to provide a first inlet zone sized for introducing fuel into only the fuel partition injection region.

20. The valved combustor according to claim 11 wherein the at least one inlet zone includes a first inlet zone sized to communicate with the inlet end of the combustion chamber.

21. The valved combustor according to claim 11 wherein the at least one inlet zone comprises a plurality of inlet zones disposed in registry with the inlet ends of the combustion chambers.

22. A combustion device comprising:

a housing having at least one inlet port;

a plurality of combustion chambers mounted within the housing, the chambers each having an inlet end for gaseous communication with the inlet port, the inlet end having a fuel partition injection region;

at least one inlet zone disposed within the inlet port, the inlet zone comprising partitions to partition the inlet zone into separate channels, wherein at least one channel is adapted to register with the fuel partition injection region of the combustion chamber.

23. The combustion device according to claim 22 comprising a rotor, wherein the plurality of combustion chambers are disposed at the rotor to permit rotation of the combustion chambers relative to the inlet port.

24. The combustion device according to claim 22 comprising a rotor, wherein the inlet port is disposed at the rotor to permit rotation of the inlet port relative to the combustion chambers.

25. The combustion device according to claim 22 wherein the fuel partition injection region comprises two or more circumferential partitions disposed within the inlet end of the combustion chamber to partition the combustion chamber along the radial direction.

26. The combustion device according to claim 25 wherein the circumferential partitions form a region therebetween to provide the fuel partition injection region.

27. The combustion device according to claim 25 wherein the circumferential partitions longitudinally extend from the inlet end into the combustion chamber a distance less than the length of the combustion chamber.

28. The combustion device according to claim 22 wherein the fuel partition injection region extends into the combustion chamber a distance sufficient to provide a pilot ignition zone.

29. The combustion device according to claim 22 wherein the fuel partition injection region extends into the combustion chamber a distance to permit turbulent mixing within a portion of the combustion chamber in which the fuel partition injection region does not extend.

30. A combustion device comprising:

a housing having at least one inlet port;

a plurality of combustion chambers mounted within the housing, the chambers each having an inlet end for gaseous communication with the inlet port, the inlet end having a fuel partition injection region;

at least one inlet zone disposed within the inlet port, the inlet zone sized for introducing fuel into only the fuel partition injection region.

31. The combustion device according to claim 30 comprising a rotor, wherein the plurality of combustion chambers are disposed at the rotor to permit rotation of the combustion chambers relative to the inlet port.

32. The combustion device according to claim 30 comprising a rotor, wherein the inlet port is disposed at the rotor to permit rotation of the inlet port relative to the combustion chambers.

33. The combustion device according to claim 30 wherein the fuel partition injection region comprises two or more circumferential partitions disposed within the inlet end of the combustion chamber to partition the combustion chamber along the radial direction.

34. The combustion device according to claim 33 wherein the circumferential partitions form a region therebetween to provide the fuel partition injection region.

35. The combustion device according to claim 33 wherein the circumferential partitions longitudinally extend from the inlet end into the combustion chamber a distance less than the length of the combustion chamber.

36. The combustion device according to claim 30 wherein the fuel partition injection region extends into the combustion chamber a distance sufficient to provide a pilot ignition zone.

37. The combustion device according to claim 30 wherein the fuel partition injection region extends into the combustion chamber a distance to permit turbulent mixing within a portion of the combustion chamber in which the fuel partition injection region does not extend.

38. The combustion device according to claim 30 wherein the inlet port comprises two or more circumferential partitions.

39. The combustion device according to claim 38 wherein the circumferential partitions partition the inlet port along the radial direction.

40. The combustion device according to claim 38 wherein the circumferential partitions form a region therebetween to provide a first inlet zone sized for introducing fuel into only the fuel partition injection region.

41. The combustion device according to claim 30 wherein the at least one inlet zone includes a first inlet zone sized to communicate with the inlet end of the combustion chamber.

* * * * *